US012485455B1

(12) United States Patent
Forster

(10) Patent No.: US 12,485,455 B1
(45) Date of Patent: Dec. 2, 2025

(54) PRESSURE CLEANING HEAD FOR CURBS

(71) Applicant: Josh Forster, Bradenton, FL (US)

(72) Inventor: Josh Forster, Bradenton, FL (US)

( * ) Notice: Subject to any disclaimer, the term of this patent is extended or adjusted under 35 U.S.C. 154(b) by 208 days.

(21) Appl. No.: 18/368,591

(22) Filed: Sep. 15, 2023

(51) Int. Cl.
*B08B 3/02* (2006.01)

(52) U.S. Cl.
CPC .......... *B08B 3/024* (2013.01); *B08B 2203/02* (2013.01)

(58) Field of Classification Search
CPC ............................ B08B 3/024; B08B 2203/02
See application file for complete search history.

(56) References Cited

U.S. PATENT DOCUMENTS 3,913,837 A * 10/1975 Grant ........................ B05B 3/18 239/198
3,931,931 A * 1/1976 Otis ........................ B05B 1/202 239/566
4,022,382 A * 5/1977 Engdahl, Jr. ............ B05B 1/202 239/557
4,095,746 A * 6/1978 Anderberg .............. B05B 1/202 239/754
4,107,816 A 8/1978 Matthews
5,135,015 A 8/1992 Young
5,449,303 A * 9/1995 McLeod .............. A46B 11/063 280/655.1
5,653,392 A * 8/1997 Wells ...................... B08B 3/024 239/722
5,707,014 A * 1/1998 Chan ......................... B08B 3/02 239/722
5,769,324 A * 6/1998 Lenhart ..................... B08B 1/12 239/323
6,267,308 B1 * 7/2001 Hall ........................ E01H 1/101 239/722
6,370,728 B1 4/2002 Burns
6,640,374 B1 * 11/2003 Courtney ................ E01H 1/053 15/93.1
7,308,900 B2 12/2007 Otterson
7,896,266 B1 3/2011 Cooper et al.
9,878,352 B2 1/2018 Buckner
11,273,799 B2 3/2022 Lundy et al.
2011/0174903 A1 * 7/2011 Hogan .................... B05B 12/34 239/754
2023/0051454 A1 * 2/2023 Slessor .............. A46B 11/0065
2023/0304241 A1 * 9/2023 Moore .................... B05B 15/68

FOREIGN PATENT DOCUMENTS

WO WO-2020176839 A1 * 9/2020 ............ F03D 80/55
WO WO2021/229357 11/2021

* cited by examiner

*Primary Examiner* — Benjamin L Osterhout
(74) *Attorney, Agent, or Firm* — LOEFFLER IP GROUP, P.A.; Bryan L. Loeffler, Esq.

(57) ABSTRACT

A cleaning head (3) for use with pressure washers wherein the cleaning head has multiple hinged sections (4, 5) that support corresponding rotating spray nozzles (18, 19). The hinged body allows the cleaning head to form around angled surfaces, such as curbs, for quick and efficient cleaning thereof.

18 Claims, 3 Drawing Sheets

PRESSURE CLEANING HEAD FOR CURBS

FIELD OF THE INVENTION

The present invention relates generally to the field of pressure washer systems and, more particularly, to a high-pressure washing apparatus that adapts to the shape of curbs, curb stops, and other raised surfaces.

BACKGROUND OF THE INVENTION

Pressure washing systems are useful for cleaning all manner of surfaces and objects. A typical pressure washing system utilizes an engine that powers a pump. The pump is connected to a water source and the pump forces pressurized water through a hose and a triggered wand having an interchangeable nozzle located on its distal end. Conventional wands provide efficient cleaning power for objects and small areas but can be if a user is cleaning a larger area, such as a driveway, parking lot, or sidewalk.

As a result, surface cleaning heads exist for cleaning flat surface areas, such as driveways, sidewalks, and so forth. These conventional cleaning heads are efficient for cleaning large swaths of a surface that is being cleaned, however, the structure of these conventional cleaning heads make them usable on curbs and other raised surfaces.

Therefore, a need exists for a cleaning head for pressure washing systems that adapts to the shape of curbs, curb stops, and other raised surfaces, to allow an entire curb to be cleaned in a single pass.

SUMMARY OF THE INVENTION

The primary object of the present invention is to provide a cleaning head for pressure washer systems wherein the cleaning head may be used on raised or angled surfaces, such as curbs, curb stops, and so forth, for quick and efficient cleaning of same.

The present invention fulfills the above and other objects by providing a cleaning head having hinged sections that allow the cleaning head to form around angled surfaces, thereby allowing spray nozzles mounted therein to be focused on an entire section of curb so the curb may be cleaned with a single pass of the cleaning head.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRA WINGS

In the following detailed description, reference will be made to the attached drawings in which.

DESCRIPTION OF THE PREFERRED EMBODIMENTS

Figure 1:
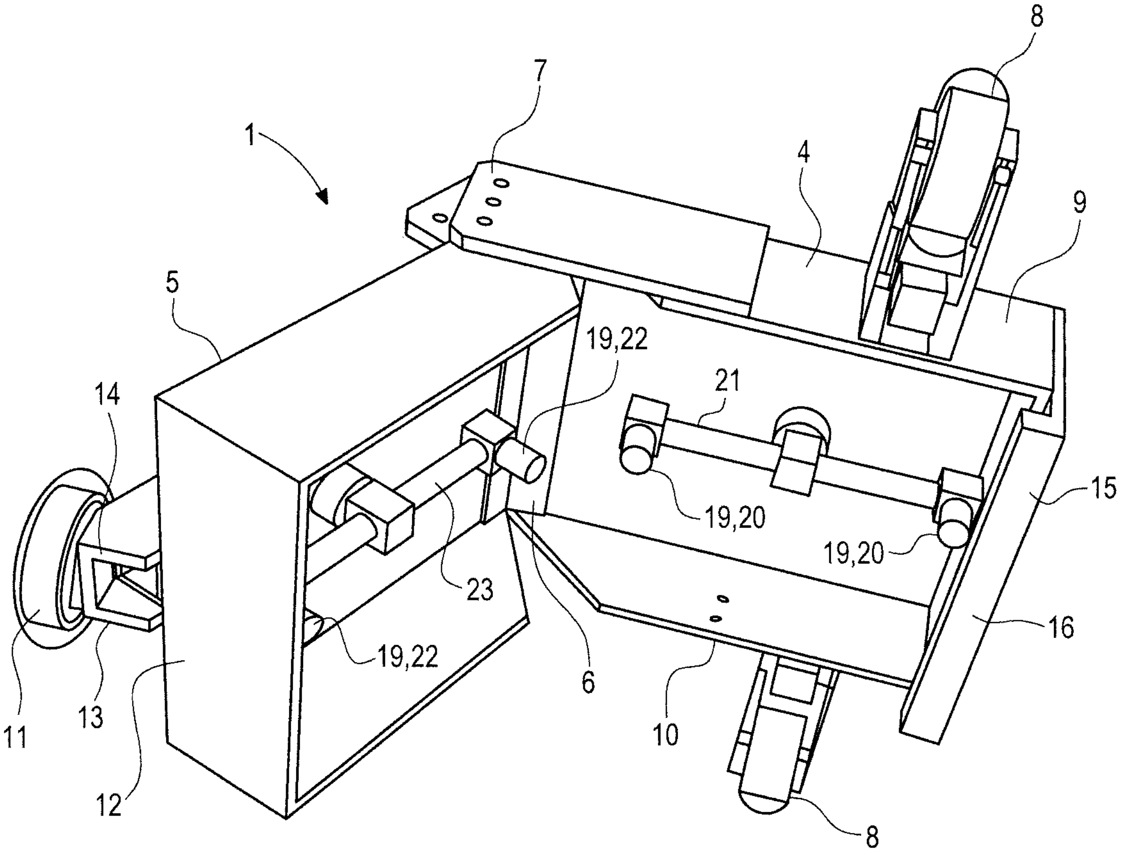
FIG. 1 is a front perspective view of a cleaning head of the present invention in use on a curb stop.
Figure 2:
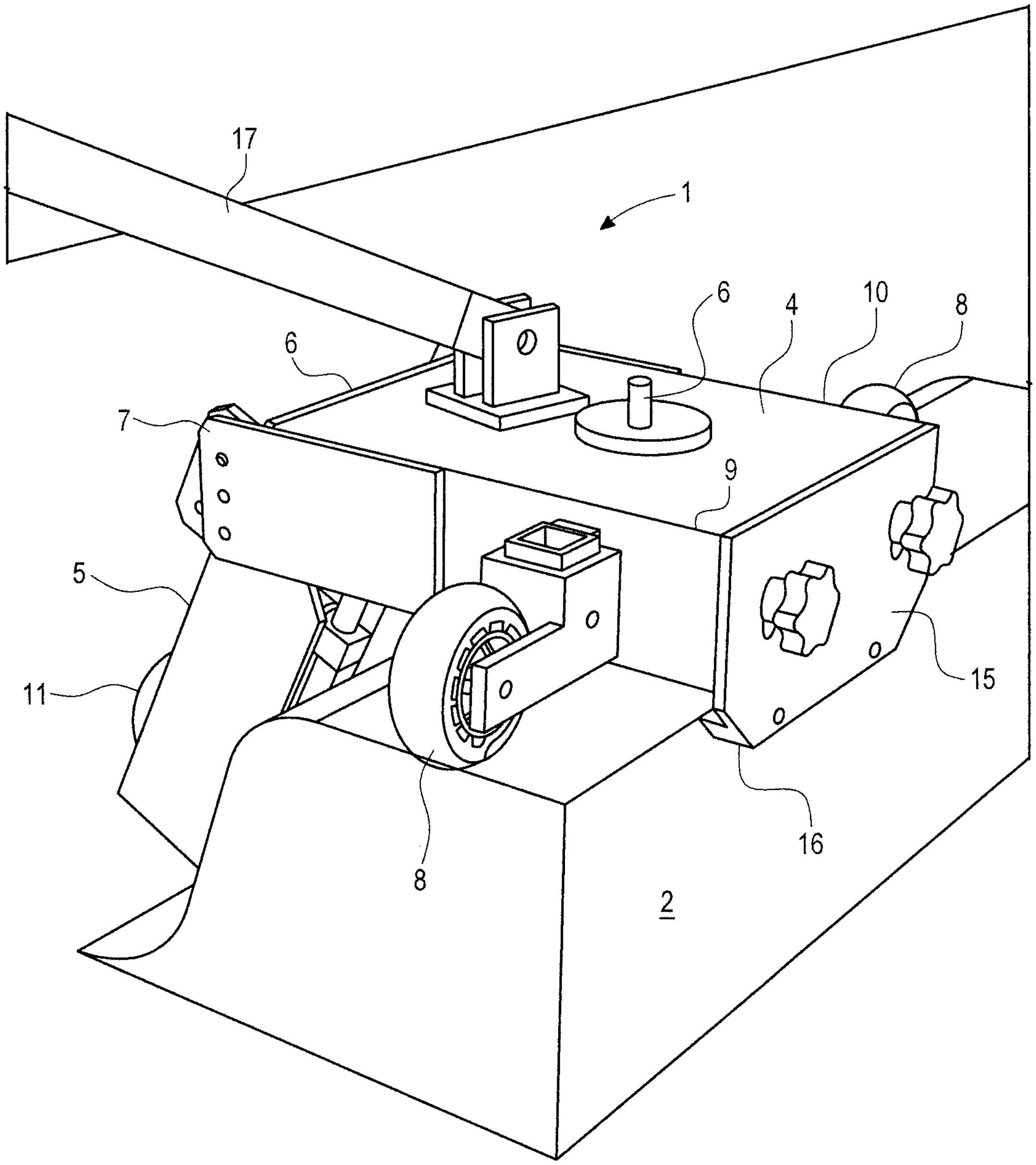
FIG. 2 is a rear perspective view of the cleaning head of the present invention in use on a curb stop.

For purposes of describing the preferred embodiment, the terminology used in reference to the numbered accessories in the drawings is as follows:

1. cleaning head, generally
2. curb
3. hose connection
4. top section of cleaning head
5. side section of cleaning head
6. hinge
7. locking means
8. top wheel
9. front edge of top section
10. rear edge of top section
11. bottom wheel
12. bottom edge of side section
13. wheel mount
14. angled bottom surface of wheel mount
15. rub plate
16. guide
17. handle
18. trigger
19. spray nozzle
20. top spray nozzle
21. top wand
22. side spray nozzle
23. side wand With general reference to FIGS. 1 and 2, front and rear perspective views, respectively, of a cleaning head 1 of the present invention in use on a curb 2 are illustrated. The cleaning head 1 comprises a horizontally oriented top section 4 that is attached to at least one angled side section 5 by a hinge 6 to allow the side section 5 to swing inward or outward to adapt to an angle of a curb stop 2 while the top section 4 remains in a horizontal position supported by the top of the curb 2. At least one hose connection 3 is located on the cleaning head 1 and provides water to spray nozzles 18 located within the cleaning head 1. At least one locking means 7 is located between the top section 4 and the side section 5 to allow a desired angle between the two elements to be locked in position.

The cleaning head 1 is preferably supported by a plurality of wheels. As illustrated herein, top support wheels 8 extend from a front edge 9 and a rear edge 10, respectively, of the top section 4 and allow the top section 4 to roll over a rear edge 10 of the curb 2. Likewise, at least one side support wheel 11 extends from a bottom edge 12 of the side section 5 and allows the side section 5 to be supported by the ground below the curb 2. The at least one side support wheel 9 is preferably height adjustable to allow the cleaning head 3 to be adaptable to curbs having a variety of heights. In addition, the at least one side support wheel 9 is preferably supported by a wheel mount 13 having an angled bottom surface 14 to provide clearance with the ground regardless of what angle the side section 5 is set to.

A rub plate 15 is mounted to the top section 4 and extends below the top section 4 to provide a guide 16 that hooks over the curb 2 so the cleaning head 1 maintains contact with the curb during use. The rub plate 15 is preferably height adjustable to accommodate various curbs 2 and sidewalks.

At least one elongated handle 17 extends from the top section 4 of the cleaning head 1 and provides a trigger 18 or equivalent means to allow a user to activate spray nozzles 20, 22 mounted under the top section 4 and side section 5, as described below.

Figure 3:
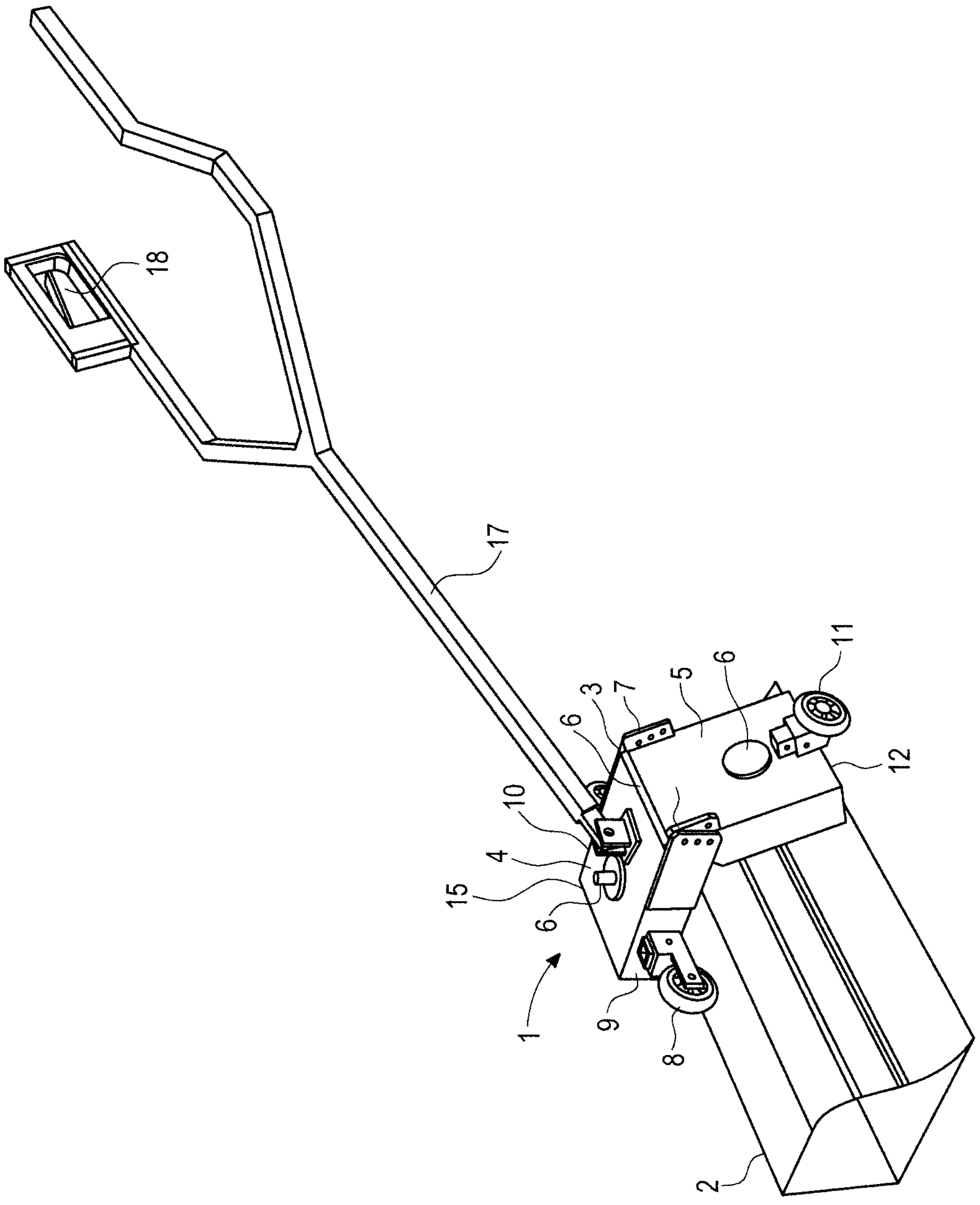
FIG. 3 is a perspective bottom view of the cleaning head of the present invention.

With reference to FIG. 3, a perspective bottom view of a cleaning head 1 of the present invention is illustrated. The cleaning head 1 comprises a horizontally oriented top section 4 that is attached to at least one angled side section 5 by a hinge or one or more pivot points or hinges 6 that allow the side section 5 to swing inward or outward to adapt to an angle of the curb 2 while the top section 4 remains in a horizontal position supported by the top of the curb 2. At least one locking means 7 is located between the top section 4 and the side section 5 to allow a desired angle between the two elements to be locked in position.

Top spray nozzles 20 are mounted within the top section 4 and are preferably mounted on a top wand 21 that rotates the spray nozzles 20 in circular patterns within the cleaning head 1. Likewise, side spray nozzles 22 are mounted within side section 5 and are preferably mounted on a side wand 23 that rotates the spray nozzles 22 in circular patterns within the cleaning head 3.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A cleaning head for use with a pressure washing system, said cleaning head comprising:
- a cleaning head having a horizontally oriented top section attached to at least one side section by a hinge to allow the side section to swing inward or outward in relation to top section;
- at least one top spray nozzle mounted within the top section;
- at least one side spray nozzle mounted within the side section;
- a connector for connecting the at least one top spray nozzle and the at least one side spray nozzle to a water source;
- at least one elongated handle extending from the cleaning head; and
- a trigger located on said elongated handle that activates said at least one top spray nozzle and the at least one side spray nozzle.

2. The cleaning head of claim 1 further comprising:
- a rub plate mounted to the top section that extends below the top section to provide a guide that hooks over a side of a curb so the cleaning head maintains contact with the curb during use.

3. The cleaning head of claim 2 wherein:
- said rub plate is height adjustable to accommodate various heights of curbs.

4. The cleaning head of claim 1 wherein:
- said at least one top spray nozzle is mounted on a top wand that rotates within the top section of the cleaning head; and
- said at least one side nozzle is mounted on a side wand that rotates within the side section of the cleaning head.

5. The cleaning head of claim 1 further comprising:
- top support wheels extending from a front edge of the top section and a rear edge of the top section, respectively; and
- at least one side support wheel extending from a bottom edge of the side section.

6. The cleaning head of claim 5 wherein:
- said at least one side support wheel is height adjustable.

7. The cleaning head of claim 1 further comprising:
- at least one locking means located between the top section and the side section to allow a desired angle to be locked in position.

8. A cleaning head for use with a water source, said cleaning head comprising:
- a cleaning head having a horizontally oriented top section attached to at least one side section by a hinge to allow the side section to swing inward or outward in relation to top section;
- at least one top spray nozzle mounted within the top section;
- at least one side spray nozzle mounted within the side section;
- a connector for connecting the at least one top spray nozzle and the at least one side spray nozzle to the water source;
- at least one elongated handle extending from the cleaning head;
- a trigger located on said elongated handle that activates said at least one top spray nozzle and the at least one side spray nozzle;
- top support wheels extending from a front edge of the top section and a rear edge of the top section, respectively; and
- at least one side support wheel extending from a bottom edge of the side section.

9. The cleaning head of claim 8 further comprising:
- a rub plate mounted to the top section that extends below the top section to provide a guide that hooks over a side of a curb so the cleaning head maintains contact with the curb during use.

10. The cleaning head of claim 9 wherein:
- said rub plate is height adjustable to accommodate various heights of curbs.

11. The cleaning head of claim 8 wherein:
- said at least one top spray nozzle is mounted on a top wand that rotates within the top section of the cleaning head; and
- said at least one side nozzle is mounted on a side wand that rotates within the side section of the cleaning head.

12. The cleaning head of claim 11 wherein:
- said at least one side support wheel is height adjustable.

13. The cleaning head of claim 8 further comprising:
- at least one locking means located between the top section and the side section to allow a desired angle to be locked in position.

14. A cleaning head for use with a water source, said cleaning head comprising:
- a cleaning head having a horizontally oriented top section attached to at least one side section by a hinge to allow the side section to swing inward or outward in relation to top section;
- at least one top spray nozzle mounted within the top section;
- at least one side spray nozzle mounted within the side section;
- a connector for connecting the at least one top spray nozzle and the at least one side spray nozzle to the water source;
- at least one elongated handle extending from the cleaning head;
- a trigger located on said elongated handle that activates said at least one top spray nozzle and the at least one side spray nozzle;
- top support wheels extending from a front edge of the top section and a rear edge of the top section, respectively;
- at least one side support wheel extending from a bottom edge of the side section; and
- a rub plate mounted to the top section that extends below the top section to provide a guide that hooks over a side of a curb so the cleaning head maintains contact with the curb during use.

15. The cleaning head of claim 14 wherein:

said rub plate is height adjustable to accommodate various heights of curbs.

16. The cleaning head of claim 14 wherein:

said at least one top spray nozzle is mounted on a top wand that rotates within the top section of the cleaning head; and said at least one side nozzle is mounted on a side wand that rotates within the side section of the cleaning head.

17. The cleaning head of claim 14 wherein:

said at least one side support wheel is height adjustable.

18. The cleaning head of claim 14 further comprising:

at least one locking means located between the top section and the side section to allow a desired angle to be locked in position.

* * * * *